(12) United States Patent
Clark et al.

(10) Patent No.: US 8,893,895 B2
(45) Date of Patent: Nov. 25, 2014

(54) CARTRIDGE FILTER ASSEMBLY

(75) Inventors: James A. Clark, Marion, IA (US);
James G. Spencer, Marion, IA (US);
James G. Frizzell, Marion, IA (US)

(73) Assignee: Freund-Vector Corporation, Marion, IA (US)

( * ) Notice: Subject to any disclaimer, the term of this patent is extended or adjusted under 35 U.S.C. 154(b) by 172 days.

(21) Appl. No.: 13/568,590

(22) Filed: Aug. 7, 2012

(65) Prior Publication Data

US 2014/0041576 A1    Feb. 13, 2014

(51) Int. Cl.
| | |
|---|---|
| *B01D 35/30* | (2006.01) |
| *B01D 29/13* | (2006.01) |
| *B01D 29/62* | (2006.01) |
| *B01D 35/02* | (2006.01) |
| *B01D 35/12* | (2006.01) |
| *B01D 29/52* | (2006.01) |

(52) U.S. Cl.
USPC ........... 210/350; 210/232; 210/236; 210/237; 210/241; 210/324; 210/351; 210/352; 210/390; 210/430; 210/431; 210/450; 210/455; 118/70

(58) Field of Classification Search
CPC ........... B01D 29/0029; B01D 29/0072; B01D 29/96; B01D 2201/0461; B01D 2201/167
See application file for complete search history.

(56) References Cited

U.S. PATENT DOCUMENTS

| | | | |
|---|---|---|---|
| 5,667,679 A * | 9/1997 | Bozenmayer et al. | ........ 210/232 |
| 2009/0178982 A1 | 7/2009 | Basten | |

FOREIGN PATENT DOCUMENTS

| | | |
|---|---|---|
| EP | 0656225 B1 | 6/1995 |
| EP | 1457246 B1 | 9/2004 |
| JP | 61197015 | 8/1992 |
| JP | 1043532 | 2/1998 |

OTHER PUBLICATIONS

English Abstract of JP 61197015, published Aug. 27, 1992, Applicant: Sankyo Seisakusho (2 pages).
English Abstract of JP 1043532, published Feb. 17, 1998, Applicant: Fujisawa Pharmaceutical (7 pages).

* cited by examiner

*Primary Examiner* — Benjamin Kurtz
(74) *Attorney, Agent, or Firm* — McKee, Voorhees & Sease

(57) ABSTRACT

The fluidized bed processor of the present invention includes an internal filter assembly with a rack and a cartridge-type filter supported at the lower end by a bracket. The rack includes an elongated rod extending through the filter. An end cap is provided on the lower end of the rod for normal sealing engagement with the filter bracket. During normal operation of the processor, the upper and lower ends of the filter are sealed. During or after cleaning of the filter, the rack is lowered, and a spring separates the filter and support bracket from the end cap so as to create a gap for drainage of cleaning fluid.

10 Claims, 3 Drawing Sheets

CARTRIDGE FILTER ASSEMBLY

BACKGROUND OF THE INVENTION

Fluidized bed processors are well known for coating, granulation, and powder drying of particulate material, such as pharmaceuticals and seeds. The processor generally includes a vessel defining a chamber through which the particles move in a fluidized bed during processing. A filter system normally includes one or more filters to prevent powder and fines from escaping the vessel. The filters typically are a pleated cartridge which allows the powder to collect on the outside of the filter. Periodically, the cartridge filters need cleaning Back flush air pulsing where an air is forced through the filter from inside to outside provides a short term cleaning solution, but does not completely clean the filters. For more thorough cleaning, the filter can be cleaned in place or washed in place inside the processor chamber using a liquid or liquid mixture. Typically, the liquid cleaning solution is introduced at a rate higher than the rate which the solution can flow through the filter media, resulting in a buildup of liquid inside the filter. Additionally, this cleaning process may leave behind particulate material that will not flow through the filter media.

Therefore, a primary objective of the present invention is the provision of an improved cartridge filter assembly which can be cleaned in place in the fluid bed processor.

Another objective of the present invention is the provision of an improved method of cleaning in place of a cartridge filter of a fluid bed processor.

Still another objective of the present invention is the provision of a cartridge filter assembly and cleaning method which provides a drain path for fluid and particulate to flow from inside the filter to outside the filter.

A further objective of the present invention is the provision of a fluidized bed cartridge filter having an end cap or plug which can be separated from the filter to create a drain opening.

Yet another objective of the present invention is the provision of a cartridge filter which is supported from the lower end within the chamber of a fluid bed processor.

Another objective of the present invention is the provision of an improved method for cleaning pleated cartridge filters in a fluid bed processor.

A further objective of the present invention is the provision of an improved cartridge filter assembly for easier cleaning of the filter in a fluid bed processor.

Still another objective of the present invention is the provision of an improved method and means for effectively, efficiently, and economically cleaning a pleated cartridge filter in a fluidized bed processor.

These and other objectives will become apparent from the following description of the invention.

SUMMARY OF THE INVENTION

A fluid bed processor includes a coating chamber with a filter assembly mounted therein. The filter has opposite first and second ends. The filter assembly is mounted on a rack with an elongated rod extending through the filter with a bracket on the lower end of the rod so as to support a filter cartridge from the lower or second end. An end cap on the second end of the rod normally engages and seals the support bracket. A spring resides between the end cap and the filter bracket. When the filter assembly is lowered, the spring lifts the bracket and cartridge filter to create a gap or space between the second end of the filter and the end cap through which cleaning liquid can drain during or after the cleaning operation of the filter. The spring is compressed when the rack is raised and expanded when the rack is lowered.

DETAILED DESCRIPTION OF THE PREFERRED EMBODIMENTS

Figure 1:
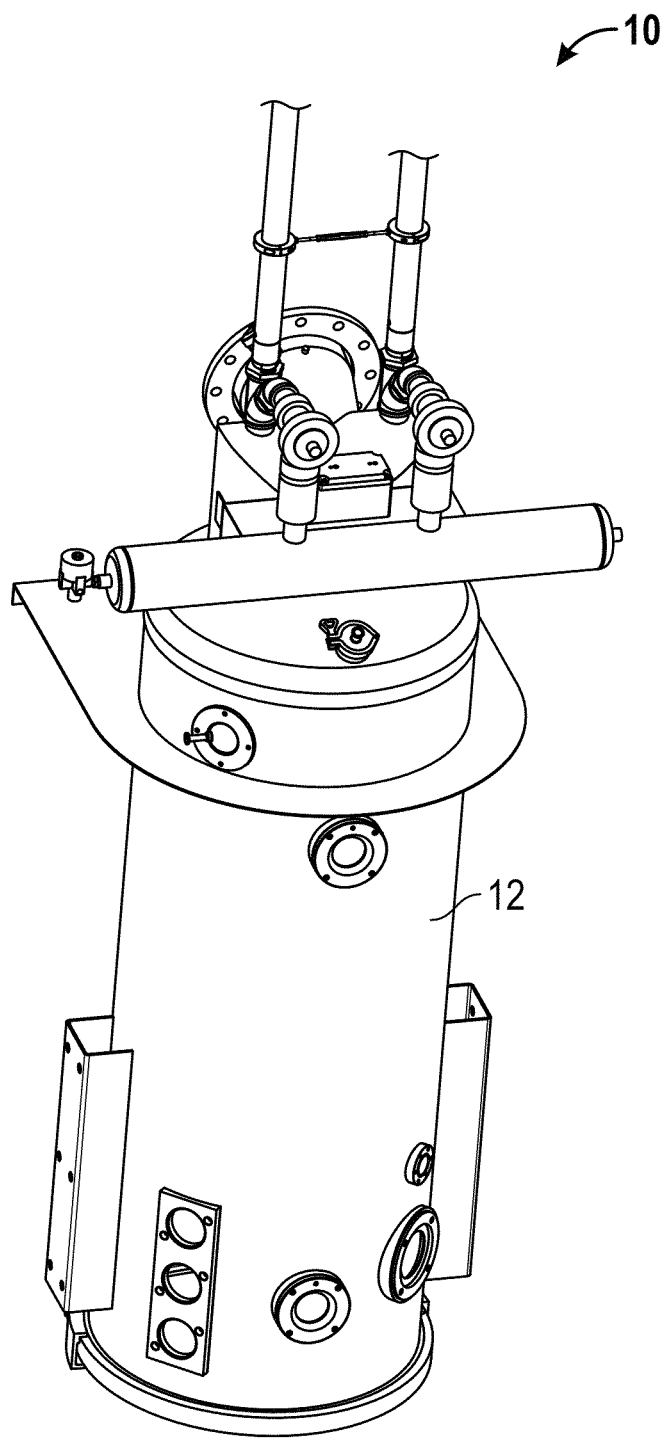
FIG. 1 is a perspective view of a fluid bed granulator processor according to the present invention.

A fluid bed processor is designated by the reference numeral 10 in FIG. 1. The processor 10 includes a vessel 12 with an internal chamber 14. The general structure of the vessel 12 can take numerous forms, as known in the art.

Figure 2:
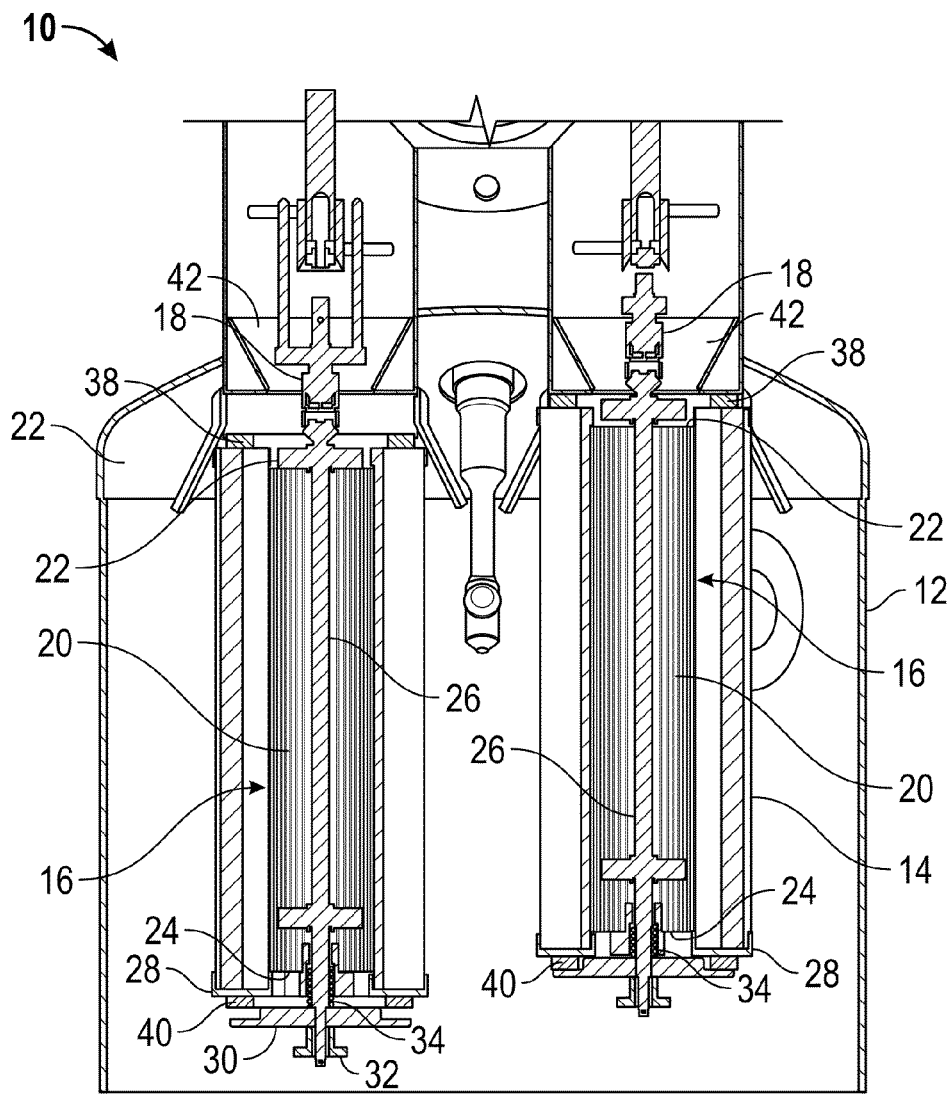
FIG. 2 is a sectional view of a portion of the processor showing a pair of filter assemblies, with one filter lowered, as in a cleaning process, and the other filter raised, as in a coating process.

The present invention is directed towards and improved filter assembly 16 within the chamber 14 of the processor 10. The processor 10 may include one or more filter assemblies 16. FIG. 2 shows a pair of assemblies 16.

Each filter assembly 16 includes a rack 18 and a filter 20. Preferably, the filter 20 is a pleated cartridge, but other types of filters may also be used in the assembly 16.

The filter 20 has an elongated cylindrical body with an upper first end 22 and a lower second end 24. The rack 18 includes a shaft or rod 26 extending axially through the filter body. An annular filter support bracket 28 is mounted on the lower end of the rod 26 to support the lower end 24 of the filter 20.

Figure 3:
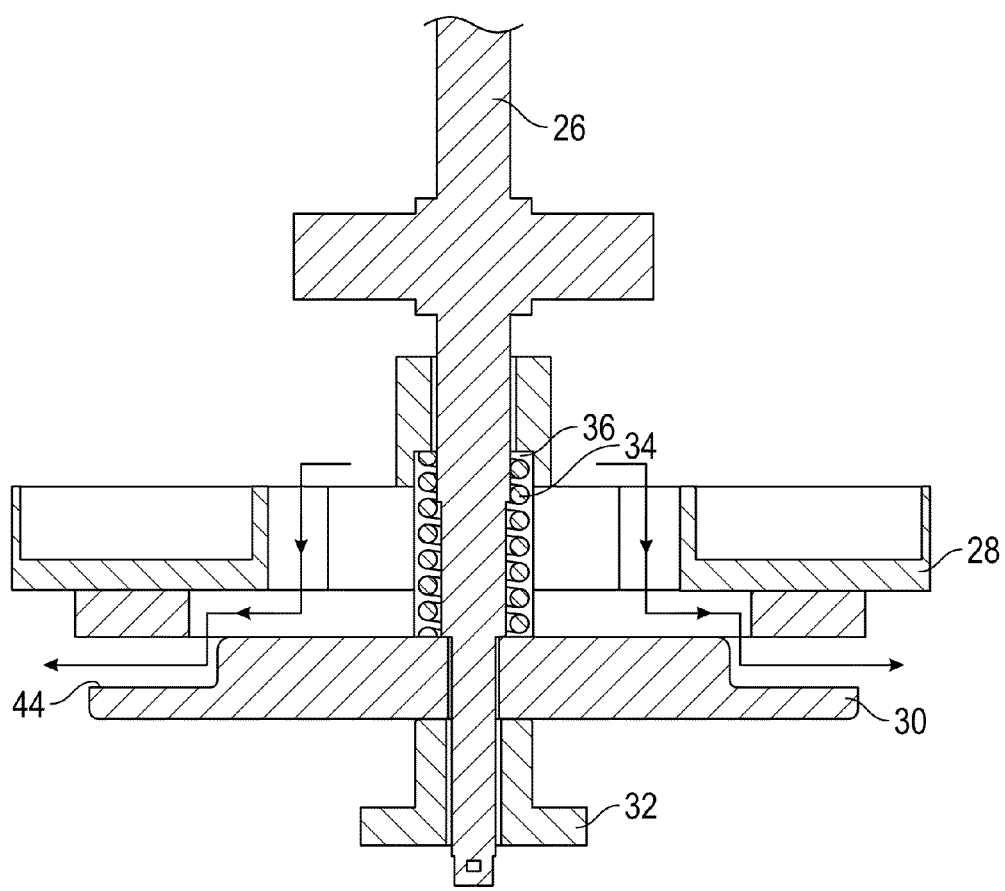
FIG. 3 is an enlarged view of the lower end of the filter assembly, with the filter cartridge removed for clarity.

The filter assembly 16 includes a plug or end cap 30 mounted on the lower end of the rod 26. A knob 32 is threadably mounted on the lower end of the rod 26 to retain the end cap 30 on the rod 26. A spring 34 is mounted on the rod 26 and extends between the support bracket 28 and the end cap 30. As seen in FIG. 3, the support bracket 28 includes a recess or cavity 36 to substantially enclose the spring 34.

First and second annular seals 38, 40 are provided on the first end 22 of the filter 20, and on the bracket 28, respectively. The upper seal 38 is adapted to sealingly engage a lower end of a housing 42, which encloses the upper end of the rack 18, as seen in FIG. 2. The lower seal 40 is adapted to sealingly engage with a shoulder 44 on the end cap 30.

The rack 18 is axially movable between a first raised position, as seen on the right hand filter assembly 16 of FIG. 2, and a second lowered position, shown in the left hand filter assembly 16 of FIG. 2. It is understood that the dual filter assemblies of FIG. 2 are shown comparatively in the first and second positions, but in preferred operation, the filter assemblies 16 will be in the same position during the coating operations of the fluid bed processor 10 and during the cleaning operation of the filters 20.

When the rack 18 is moved from the first raised position to the second lowered position, the rod 26 moves downwardly such that the upper seal 38 is disengaged from the housing 42. The spring 34 biases the support bracket 28 and filter 20 upwardly so that the lower seal 40 disengages from the shoulder 44 of the end cap 30. Thus, when the rack 18 is lowered, a gap or space between the cap 30 and the bracket 28 forms a drain opening, as indicated by the arrows in FIG. 3, through which cleaning solution can drain, along with other particulate material flushed inside the filter 20. When the filter cleaning process is completed, the rack 18 can be moved to the raised position, thereby re-sealing the seals 38, 40, closing the upper and lower ends of the filter assembly. Then, the normal coating, granulation, or drying process of the fluid bed processor 10 can begin.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An improved granulation processor having a coating chamber for coating particles circulating in a fluidized bed in the chamber, the improvement comprising:
    a rod extending vertically through the chamber and being movable between a raised position for coating particles and a lowered position for cleaning;
    a filter supported by the rod within the chamber and having a body portion with upper and lower ends;
    an end cap on the lower end of the filter and being sealed with the filter body when the rod is in the raised position;
    the filter being sealed at the upper and lower ends when the rod is in the raised position and unsealed at the upper and lower ends when the rod is in the lowered position;
    a spring on the rod and engaging the end cap;
    whereby the spring unseals the end cap from the filter body when the rod is in the lowered position to allow drainage of cleaning fluid from inside the filter; and
    wherein the spring biases the filter body away from the end cap.

2. The improved granulation processor of claim 1 further comprising a support bracket on the lower end of the rod to support the filter.

3. The improved granulation processor of claim 2 wherein the end cap has an annular shoulder to matingly engage with the support bracket.

4. The improved granulation processor of claim 2 further comprising an annular seal between the support bracket and the end cap.

5. The improved granulation processor of claim 1 wherein the spring is compressed when the rod is in the raised position.

6. The improved granulation processor of claim 1 wherein the spring is expanded when the rod is in the lowered position.

7. The improved granulation processor of claim 1 wherein the spring lifts the filter when the rod is moved to the lowered position.

8. The improved granulation processor of claim 1 further comprising an annular seal mounted on a lower end of the filter body, and the end cap engaging the seal in the sealed position and disengaging the seal in the unsealed position.

9. The improved granulation processor of claim 1 wherein a knob is threadably mounted on the rod to support the end cap.

10. The improved granulation processor of claim 1 wherein the filter is slidably mounted on the rod.

* * * * *